United States Patent
Park et al.

(10) Patent No.: US 12,294,406 B2
(45) Date of Patent: May 6, 2025

(54) STATIC TARGET DETECTION FOR RF SENSING IN FULL-DUPLEX COMMUNICATION SYSTEMS

(71) Applicant: QUALCOMM Incorporated, San Diego, CA (US)

(72) Inventors: Seyong Park, San Diego, CA (US); Alexandros Manolakos, Escondido, CA (US); Weimin Duan, San Diego, CA (US); Gokul Sridharan, Sunnyvale, CA (US); Jay Kumar Sundararajan, San Diego, CA (US); Muhammad Sayed Khairy Abdelghaffar, San Jose, CA (US); Naga Bhushan, San Diego, CA (US); Wanshi Chen, San Diego, CA (US); Taesang Yoo, San Diego, CA (US); Hwan Joon Kwon, San Diego, CA (US); Krishna Kiran Mukkavilli, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 234 days.

(21) Appl. No.: 17/411,312

(22) Filed: Aug. 25, 2021

(65) Prior Publication Data

US 2022/0069860 A1    Mar. 3, 2022

Related U.S. Application Data

(60) Provisional application No. 63/070,708, filed on Aug. 26, 2020.

(51) Int. Cl.
*H04B 1/525* (2015.01)
*H04L 1/00* (2006.01)
(Continued)

(52) U.S. Cl.
CPC .......... *H04B 1/525* (2013.01); *H04L 5/1461* (2013.01); *H04W 4/023* (2013.01); *H04L 1/0003* (2013.01); *H04W 4/40* (2018.02)

(58) Field of Classification Search
CPC .... H04B 7/0617; H04B 7/0695; H04B 7/088; H04B 17/336; H04B 17/27; H04B 7/0413;
(Continued)

(56) References Cited

U.S. PATENT DOCUMENTS 11,493,628 B1   11/2022 Parodi
11,520,032 B2   12/2022 Huang et al.
(Continued)

OTHER PUBLICATIONS

International Search Report and Written Opinion—PCT/US2021/047648—ISA/EPO—Feb. 28, 2022.
(Continued)

*Primary Examiner* — Golam Sorowar
(74) *Attorney, Agent, or Firm* — QUALCOMM Incorporated

(57) ABSTRACT

A communications transceiver system that employs self-interference mitigation techniques can detect static objects by using techniques that introduce angular or Doppler diversity. This can include moving Tx and Rx antennas and/or performing beam sweeping. When processing RF sensing data from reflected RF signals, self-interference mitigation techniques can be used and compensation can be made for the movement and/or beam sweeping to allow for both self-interference mitigation and detection of static objects.

16 Claims, 7 Drawing Sheets

(51) Int. Cl.
*H04L 5/14* (2006.01)
*H04W 4/02* (2018.01)
*H04W 4/40* (2018.01)

(58) Field of Classification Search
CPC .. H04B 17/318; H04B 17/309; H04B 7/0691; H04B 17/30; H04B 7/0456; H04B 7/0814; H04B 1/3838; H04B 7/0404; H04B 7/0408; H04B 7/0608; H04B 7/10; H04B 1/04; H04B 1/123; H04B 1/16; H04B 17/103; H04B 17/21; H04B 7/0634; H04B 17/12; H04B 5/02; H04B 7/0465; H04B 7/0602; H04B 7/08; G01S 7/006; G01S 5/12; G01S 5/10; G01S 5/0273; G01S 13/003; G01S 13/32; G01S 13/42; G01S 5/00; G01S 5/06; G01S 13/04; G01S 13/56; G01S 7/023; G01S 13/887; G01S 2013/0245; G01S 1/042; G01S 13/765; G01S 13/878; G01S 13/888; G01S 3/14; G01S 5/0218; G01S 5/0221; H04W 24/10; H04W 16/28; H04W 4/029; H04W 64/00; H04W 4/025; H04W 64/006; H04W 64/003; H04W 24/08; H04W 52/42; H04W 72/0446; H04W 72/51; H04W 84/12; H04W 24/02; H04W 52/146; H04W 72/0453; H04W 72/542; H04W 88/02; H04W 88/08; H04W 48/16; H04W 52/30
See application file for complete search history.

(56) References Cited

U.S. PATENT DOCUMENTS

| | | | |
|---|---|---|---|
| 2016/0266245 A1* | 9/2016 | Bharadia | G01S 7/038 |
| 2019/0246394 A1* | 8/2019 | Asplund | H04W 36/30 |
| 2020/0057155 A1* | 2/2020 | Achour | G01S 13/931 |
| 2020/0142406 A1* | 5/2020 | Srini | G01S 17/931 |
| 2020/0319328 A1* | 10/2020 | Shtrom | G01S 13/758 |
| 2021/0011147 A1* | 1/2021 | Va | G01S 7/415 |
| 2021/0063563 A1 | 3/2021 | Zalevsky et al. | |
| 2021/0215814 A1* | 7/2021 | Guan | G01S 13/08 |

OTHER PUBLICATIONS

Barneto C.B., et al., "Full-Duplex OFDM Radar With LTE and 5G Nr Waveforms: Challenges, Solutions, and Measurements", IEEE Transactions on Microwave Theory and Techniques, IEEE, USA, vol. 67, No. 10, Oct. 1, 2019 (Oct. 1, 2019), 13 pages, XP011748777, ISSN: 0018-9480, DOI: 10.1109/TMTT.2019.2930510 [retrieved on Oct. 3, 2019] p. 4047-p. 4048.

Huang Y., et al., "Constant Envelope OFDM RadCom Fusion System", EURASIP Journal on Wireless Communications and Networking, Biomed Central ltd, London, UK, vol. 2018, No. 1, May 4, 2018 (May 4, 2018), 16 pages, XP021255977, DOI: 10.1186/S13638-018-1105-6, p. 1-p. 2 figure 1.

Mercier S., et al., "CA-CFAR Detection Based on an AWG Interference Model in a Low-Complexity WCP-OFDM Receiver: Topics: E5 MIMO Radar, A3 OFDM/Multicarrier", 2017 51st Asilomar Conference on Signals, Systems, and Computers, IEEE, Oct. 29, 2017 (Oct. 29, 2017), pp. 1645-1649, XP033346316, DOI: 10.1109/ACSSC.2017.8335638 [retrieved on Apr. 10, 2018] p. 1646-p. 1647.

Mercier S., et al., "Successive Self-Interference Cancellation in a Low-Complexity WCP-OFDM Radar Receiver", 2018 52nd Asilomar Conference on Signals, Systems, and Computers, IEEE, Oct. 28, 2018 (Oct. 28, 2018), pp. 712-716, XP033521153, DOI: 10.1109/ACSSC.2018.8645413 [retrieved on Feb. 19, 2019] the whole document.

Partial International Search Report—PCT/US2021/047648—ISA/EPO—Dec. 22, 2021.

* cited by examiner

STATIC TARGET DETECTION FOR RF SENSING IN FULL-DUPLEX COMMUNICATION SYSTEMS

RELATED APPLICATIONS

This application claims the benefit of U.S. Provisional Application No. 63/070,708, filed Aug. 26, 2020, entitled "STATIC TARGET DETECTION FOR RADAR IN FULL-DUPLEX COMMUNICATION SYSTEMS", which is assigned to the assignee hereof, and incorporated herein in its entirety by reference.

BACKGROUND

Modern wireless communication can involve the use of radio frequency (RF) signals that are not only capable of providing communication functionality but can also serve to perform RF sensing. However, given the full-duplex nature of communication RF signals may be transmitted and received at the same time. This can result in strong self-interference from direct path RF interference from a transmitter (Tx) antenna to a receiver (Rx) antenna. And although techniques can be performed to mitigate this self-interference, these techniques traditionally use filters directed toward reducing static signals, which can make the detection of static objects difficult.

SUMMARY

A communications transceiver system that employs self-interference mitigation techniques can detect static objects by using techniques that introduce angular and/or Doppler diversity. This can include moving Tx and Rx antennas and/or performing beam sweeping. When processing data from reflected RF signals, self-interference mitigation techniques can be used and compensation can be made for the movement and/or beam sweeping, allowing for both self-interference mitigation and detection of static objects.

An example method of operating a communications transceiver system to detect static objects, according to this disclosure, comprises transmitting radio frequency (RF) signals using a Tx antenna of the communications transceiver system. The method also includes, while transmitting the RF signals, performing a translational movement of either or both of the Tx antenna or an Rx antenna of the communications transceiver system. The method also includes receiving, via the Rx antenna, reflected RF signals, the reflected RF signals corresponding to at least a portion of the transmitted RF signals reflecting off an object. The method also includes determining a location of the object based at least in part on the reflected RF signals, where determining the location of the object may comprise: conducting self-interference mitigation, and providing compensation for the translational movement of either or both of the Tx antenna or the Rx antenna.

An example method of operating a communications transceiver system to detect static objects, according to this disclosure, comprises transmitting radio frequency (RF) signals using a plurality of beams. The method also includes receiving reflected RF signals, the reflected RF signals corresponding to at least a portion of the transmitted RF signals, transmitted at different angles using the plurality of beams, reflecting off an object. The method also includes determining a location of the object based at least in part on the reflected RF signals, where determining the location of the object may comprise conducting self-interference mitigation.

An example communications transceiver system for detecting static objects, according to this disclosure, comprises a transceiver may comprising a Tx antenna and an Rx antenna, a memory, and one or more processors communicatively coupled with the transceiver and the memory, where the one or more processors are configured to: transmit radio frequency (RF) signals using the Tx antenna. The one or more processors are also configured to, while transmitting the RF signals, perform a translational movement of either or both of the Tx antenna or the Rx antenna. The one or more processors are also configured to receive, via the Rx antenna, reflected RF signals, the reflected RF signals corresponding to at least a portion of the transmitted RF signals reflecting off an object. The one or more processors are also configured to determine a location of the object based at least in part on the reflected RF signals, where determining the location of the object may comprise: conduct self-interference mitigation; and provide compensation for the translational movement of either or both of the Tx antenna or the Rx antenna.

An example communications transceiver system for detecting static objects, according to this disclosure, comprises a transceiver, a memory, and one or more processors communicatively coupled with the transceiver and the memory, where the one or more processors are configured to transmit, via the transceiver, radio frequency (RF) signals using a plurality of beams. The one or more processors are also configured to receive, via the transceiver, reflected RF signals, the reflected RF signals corresponding to at least a portion of the transmitted RF signals, transmitted at different angles using the plurality of beams, reflecting off an object. The one or more processors are also configured to determine a location of the object based at least in part on the reflected RF signals, where determining the location of the object may comprise conducting self-interference mitigation.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

Figure 1:
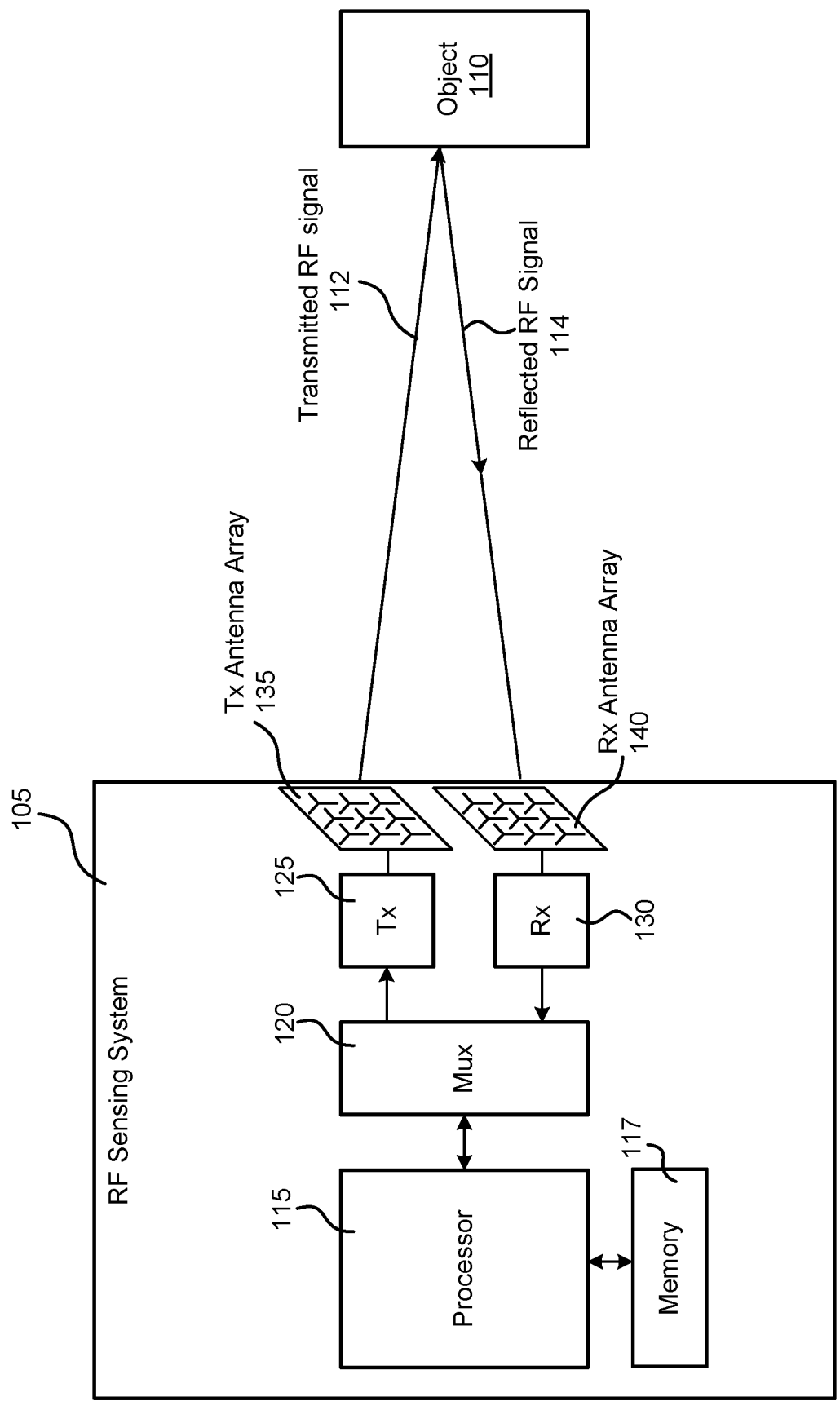
FIG. 1 is a block diagram of an RF sensing system, according to an embodiment.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3, etc. or as 110a, 110b, 110c, etc. When referring to such an element using only the first number, any instance of the element is to be understood (e.g., element 110 in the previous example would refer to elements 110-1, 110-2, and 110-3 or to elements 110a, 110b, and 110c).

DETAILED DESCRIPTION

The following description is directed to certain implementations for the purposes of describing innovative aspects of various embodiments. However, a person having ordinary skill in the art will readily recognize that the teachings herein can be applied in a multitude of different ways. The described implementations may be implemented in any device, system, or network that is capable of transmitting and receiving radio frequency (RF) signals according to any communication standard, such as any of the Institute of Electrical and Electronics Engineers (IEEE) IEEE 802.11 standards (including those identified as Wi-Fi® technologies), the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Rate Packet Data (HRPD), High Speed Packet Access (HSPA), High Speed Downlink Packet Access (HSDPA), High Speed Uplink Packet Access (HSUPA), Evolved High Speed Packet Access (HSPA+), Long Term Evolution (LTE), Advanced Mobile Phone System (AMPS), or other known signals that are used to communicate within a wireless, cellular or interne of things (IoT) network, such as a system utilizing 3G, 4G, 5G, 6G, or further implementations thereof, technology.

As used herein, an "RF signal" or "wireless signal" comprises an electromagnetic wave that transports information through the space between a transmitter (or transmitting device) and a receiver (or receiving device). As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

Several illustrative embodiments will now be described with respect to the accompanying drawings, which form a part hereof. The ensuing description provides embodiment(s) only and is not intended to limit the scope, applicability or configuration of the disclosure. Rather, the ensuing description of the embodiment(s) will provide those skilled in the art with an enabling description for implementing an embodiment. It is understood that alternative embodiments may include various changes may be made in the function and arrangement of elements.

RF sensing can be used in modern applications for imaging, proximity detection, object detection, and more. Although other sensors may be capable of performing similar functionality, RF sensing can be useful in many circumstances. Of particular relevance is the fact that modems used for wireless communication in modern mobile devices (e.g., mobile phones, tablets) and similar communication hardware and corresponding network devices (e.g., cellular base stations) are capable of performing RF sensing, in addition to providing data communication functionality. As such, embodiments employing RF sensing in many communication applications may leverage communication hardware and/or software to further obtain RF sensing functionality. Additionally, an RF sensing system has an ability to implement a flexible range of azimuth, elevation, distance, velocity (Doppler), and signal-to-noise ratio (SNR) sensing, allowing the RF sensing system to detect objects that other sensors may not.

Although many embodiments described herein are described in the context of base stations or other transmission/reception points (TRPs) within a wireless communication network (e.g., cellular carrier network), embodiments are not so limited. Embodiments for static target detection for a communications transceiver as described herein below may be utilized by different types of wireless devices, in a variety of wireless systems, and a variety of applications.

Figure 7:
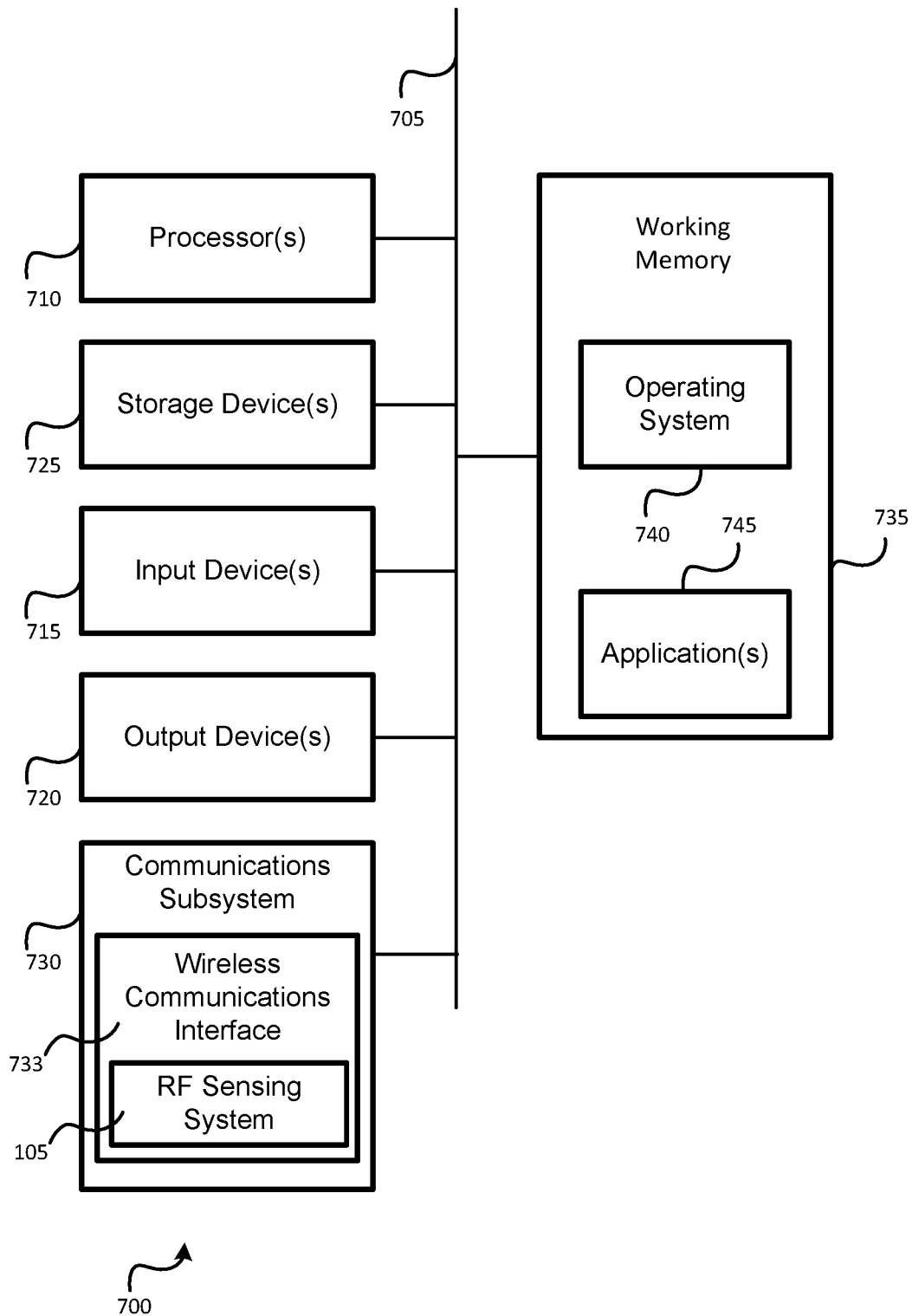
FIG. 7 is a block diagram of an embodiment of an electronic device.

FIG. 1 is a block diagram of an RF sensing system 105, according to an embodiment. As used herein, the terms "waveform" and "sequence" and derivatives thereof are used interchangeably to refer to RF signals generated by a transmitter of the RF sensing system and received by a receiver of the RF sensing system for object detection. A "pulse" and derivatives thereof are generally referred to herein as waveforms comprising a sequence or complementary pair of sequences transmitted and received to generate a Channel Impulse Response (CIR). The RF sensing system 105 may comprise a standalone device or, as described in more detail below, may be integrated into a larger electronic device (Example components of such an electronic device are illustrated in FIG. 7 and discussed in detail hereafter.)

With regard to the functionality of the RF sensing system 105 in FIG. 1, the RF sensing system 105 can detect an object 110 by generating a series of transmitted RF signals 112 (comprising one or more pulses). Some of these transmitted RF signals 112 reflect off of the object 110, and these reflected RF signals 114 are then processed by the RF sensing system 105 using beamforming (BF) and Digital Signal Processing (DSP) techniques (including leakage cancellation) to determine the object's location (azimuth, elevation, velocity, and range) relative to the RF sensing system 105. Some embodiments may implement a flexible field of view (FOV), and thus the RF sensing system 105 can detect an object 110 within a select volume of space. This volume of space can be defined by a range of azimuths, elevations, and distances from the RF sensing system 105. This volume of space may also be defined by an FOV (a range of azimuths and elevations) and a range of distances within the FOV.

As illustrated, the system 105 includes a processor 115, memory 117, multiplexer (mux) 120, Tx processing circuitry 125, and Rx processing circuitry 130. (The RF sensing system 105 may include additional components not illustrated, such as a power source, user interface, or electronic interface.) It can be noted, however, that these components of the RF sensing system 105 may be rearranged or otherwise altered in alternative embodiments, depending on desired functionality. Moreover, as used herein, the terms "transmit circuitry" or "Tx circuitry" refer to any circuitry utilized to create and/or transmit the transmitted RF signal 112. Likewise, the terms "receive circuitry" or "Rx circuitry" refer to any circuitry utilized to detect and/or process the reflected RF signal 114. As such, "transmit circuitry" and "receive circuitry" may not only comprise the Tx processing circuitry 125 and Rx processing circuitry 130, respectively, but may also comprise the mux 120 and processor 115. In some embodiments, the processor may compose at least part of a modem and/or wireless communications interface. In some embodiments, more than one processor may be used to perform the functions of the processor 115 described herein.

The Tx processing circuitry 125 and Rx circuitry 130 may comprise subcomponents for respectively generating and detecting RF signals. As a person of ordinary skill in the art will appreciate, the Tx processing circuitry 125 may therefore include a pulse generator, digital-to-analog converter (DAC), a mixer (for up-mixing the signal to the transmit frequency), one or more amplifiers (for powering the transmission via Tx antenna array 135), etc. The Rx processing circuitry 130 may have similar hardware for processing a detected RF signal. In particular, the Rx processing circuitry 130 may comprise an amplifier (for amplifying a signal received via Rx antenna 140), a mixer for down-converting the received signal from the transmit frequency, an analog-to-digital converter (ADC) for digitizing the received signal, and a pulse correlator providing a matched filter for the pulse generated by the Tx processing circuitry 125. The Rx processing circuitry 130 may therefore use the correlator output as the CIR, which can be processed by the processor 115 (or other circuitry) for leakage cancellation as described herein. Other processing of the CIR may also be performed, such as object detecting, range, speed, or direction of arrival (DOA) estimation.

BF is further enabled by a Tx antenna array 135 and Rx antenna array 140. Each antenna array 135, 140 comprises a plurality of antenna elements. It can be noted that, although the antenna arrays 135, 140 of FIG. 1 include two-dimensional arrays, embodiments are not so limited. Arrays may simply include a plurality of antenna elements along a single dimension, for example.

It can be further noted that the properties of the transmitted RF signal 112 may vary, depending on the technologies utilized. Techniques provided herein can apply generally to "mmWave" technologies, which typically operate at 57-71 GHz, but may include frequencies ranging from 30-300 GHz. This includes, for example, frequencies utilized by the 802.11ad Wi-Fi standard (operating at 60 GHz). That said, some embodiments may utilize RF sensing with frequencies outside this range. For example, in some embodiments, Fifth Generation (5G) New Radio (NR) frequency bands (e.g., 28 GHz) may be used. (5G NR, which is a wireless technology being defined by the 3rd Generation Partnership Project (3GPP), may be referred to herein as simply "5G" and/or "NR".) Because RF sensing may be performed in the same bands as communication, hardware may be utilized for both communication and RF sensing, as previously noted and described hereafter in more detail with regard to FIG. 2. For example, one or more of the components of the RF sensing system 105 shown in FIG. 1 may be included in a wireless modem (e.g., Wi-Fi or NR modem), a mobile network base station, or the like. Additionally, techniques may apply to RF signals comprising any of a variety of pulse types, including compressed pulses (e.g., comprising Chirp, Golay, Barker, or Ipatov sequences) may be utilized. That said, embodiments are not limited to such frequencies and/or pulse types. Additionally, because the RF sensing system may be capable of sending RF signals for communication (e.g., using 802.11 or NR wireless technology), embodiments may leverage channel estimation and/or other communication-related functions for providing RF sensing functionality as described herein. Accordingly, the pulses may be the same as those used in at least some aspects of wireless communication.

As noted, the RF sensing system 105 may be integrated into an electronic device in which object detection and/or other RF sensing functionality is desired. For example, the RF sensing system 105, may be part of communication hardware found in base stations of a wireless communication network. Other devices, too, may utilize the techniques provided herein. These can include, for example, mobile devices (e.g., cell phones, tablets, portable media players, laptops, wearable devices, virtual reality (VR) devices, augmented reality (AR) devices), as well as other electronic devices (e.g., security devices, on-vehicle systems). That said, RF sensing-based static target detection as described herein may be performed by a RF sensing system 105 that may not be otherwise used in wireless communication. However, issues regarding leakage are particularly difficult to overcome in a communications transceiver system. Such a system is illustrated in FIG. 2.

Figure 2:
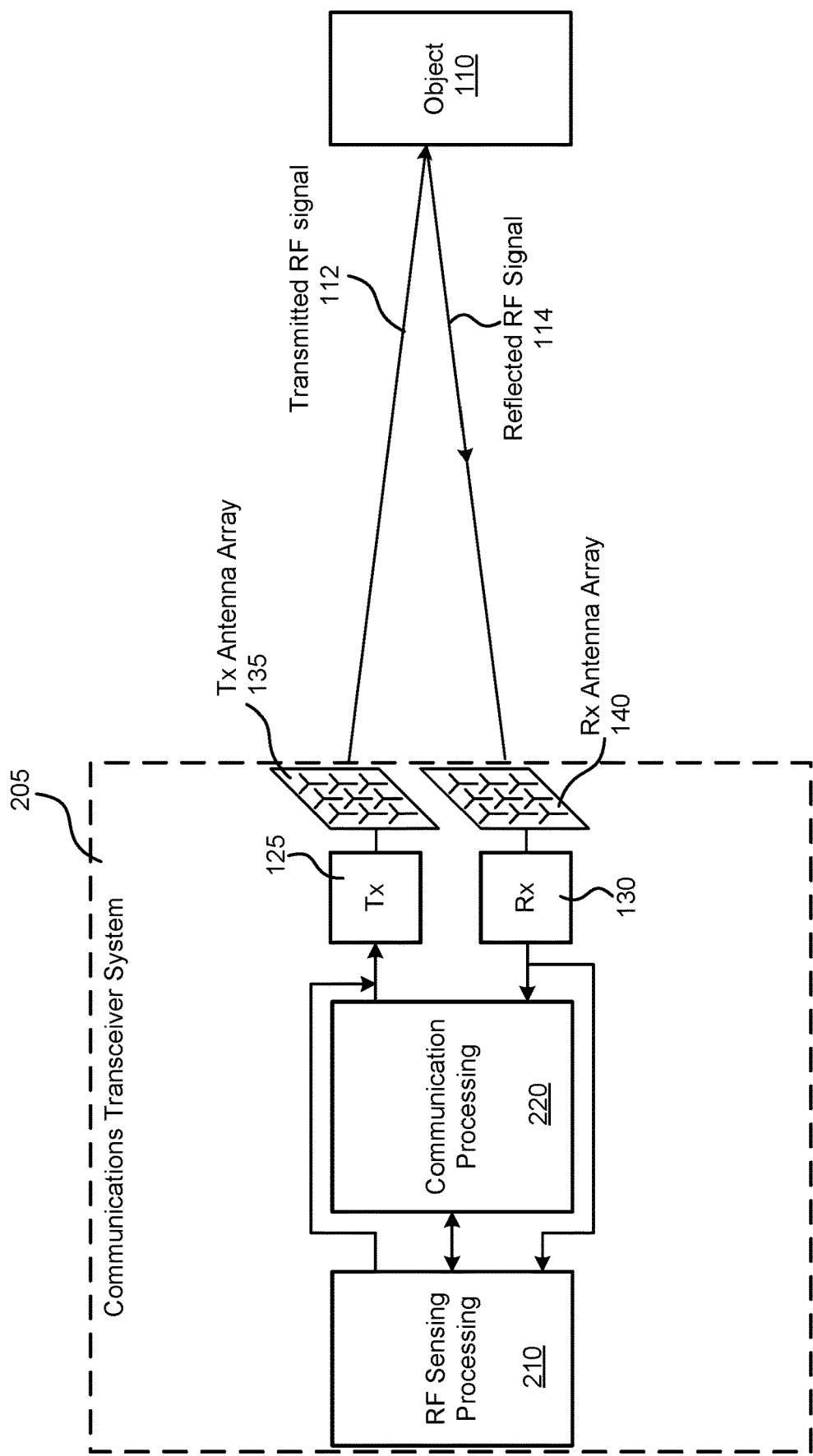
FIG. 2 is a block diagram of communications transceiver system, according to an embodiment.

FIG. 2 is a block diagram of a communications transceiver system 205, according to an embodiment. Many of the features illustrated in FIG. 2 are similar to FIG. 1. Here, however, the communications transceiver system 205 includes additional communication capabilities. In particular, the communications transceiver system 205 includes components for both RF sensing processing 210, and communication processing 220. As illustrated, RF sensing processing 210 and communication processing 220 both may use Tx processing circuitry 125 and Rx processing circuitry 130 to perform RF sensing and communication functionality, respectively. As such, RF sensing processing 210 and communication processing 220 each may comprise a mux, one or more processors, and a memory (similar to those illustrated in FIG. 1). The communications transceiver system 205 may be utilized in any of a variety of devices, similar to the RF sensing system 105 of FIG. 1.

According to some embodiments, RF sensing processing 210 can be communicatively coupled with communication processing 220, as illustrated, to coordinate the transmittal of transmitted RF signal 112 and reflected RF signal 114, so that these signals can be used for both communication and RF sensing. For example, communication processing 220 may perform a beam sweep as part of a communication standard and provide information regarding the timing and direction of transmitted RF signals along each beam of a plurality of discrete beams, so that RF sensing processing 210 can process resulting reflected RF signals to provide RF sensing functionality. Alternatively, RF signals may be transmitted using one or more moving beams. Because the signals are used in communication, they may comprise orthogonal frequency-division multiplexing (OFDM) signals. Additional or other types of coordination may occur between RF sensing processing 210 and communication processing 220 to be able to use RF signals (e.g., transmitted RF signal 112 and reflected RF signal 114) for both RF sensing and communication.

This configuration can include benefits versus having separate communication and RF sensing systems. For example, by sharing components between RF sensing and communication functions, the RF sensing and communication system 205 can have a reduced cost versus having separate RF sensing and communication systems. In fact, in some embodiments, existing communication systems may be modified to include RF sensing processing 210 with only minor software and/or hardware changes, allowing a communication system to additionally provide RF sensing for relatively low cost. Furthermore, the use of a transmitted RF signal 112 and reflected RF signal 114 for both RF sensing and communication functions can also provide efficiencies over separate RF sensing and communication systems.

It can be noted, however, that complications can arise in the combination of RF sensing and communication in the manner illustrated in FIG. 2. Because of the full-duplex nature of communication, the communications transceiver system 205 may transmit and receive RF signals at the same time. That is, the Rx processing circuitry 130 and Rx antenna array 140 may be observing a reflected RF signal 114 at the same time Tx processing circuitry 125 and Tx antenna array 135 are transmitting a transmitted RF signal 112. (In such instances, the reflected RF signal 114 may correspond with an earlier-transmitted RF signal 112.) This can result in strong self-interference from direct path (leakage) RF interference from Tx antenna array 135 directly to Rx antenna array 140.

Traditional techniques for mitigating self-interference are helpful in many cases but have their shortcomings. Self-interference appears as a static strong target at almost zero distance. Traditional techniques for mitigating self-interference therefore often implement filters directed toward reducing these types of strong static signals. However, this can make detecting static objects difficult.

Embodiments herein address these and other issues by implementing one or more techniques for static RF sensing detection that make static targets detectable despite the use of traditional self-interference mitigation. According to embodiments, these techniques can involve physically moving the Tx and Rx antenna arrays and/or conducting beam sweeping.

Figure 3:
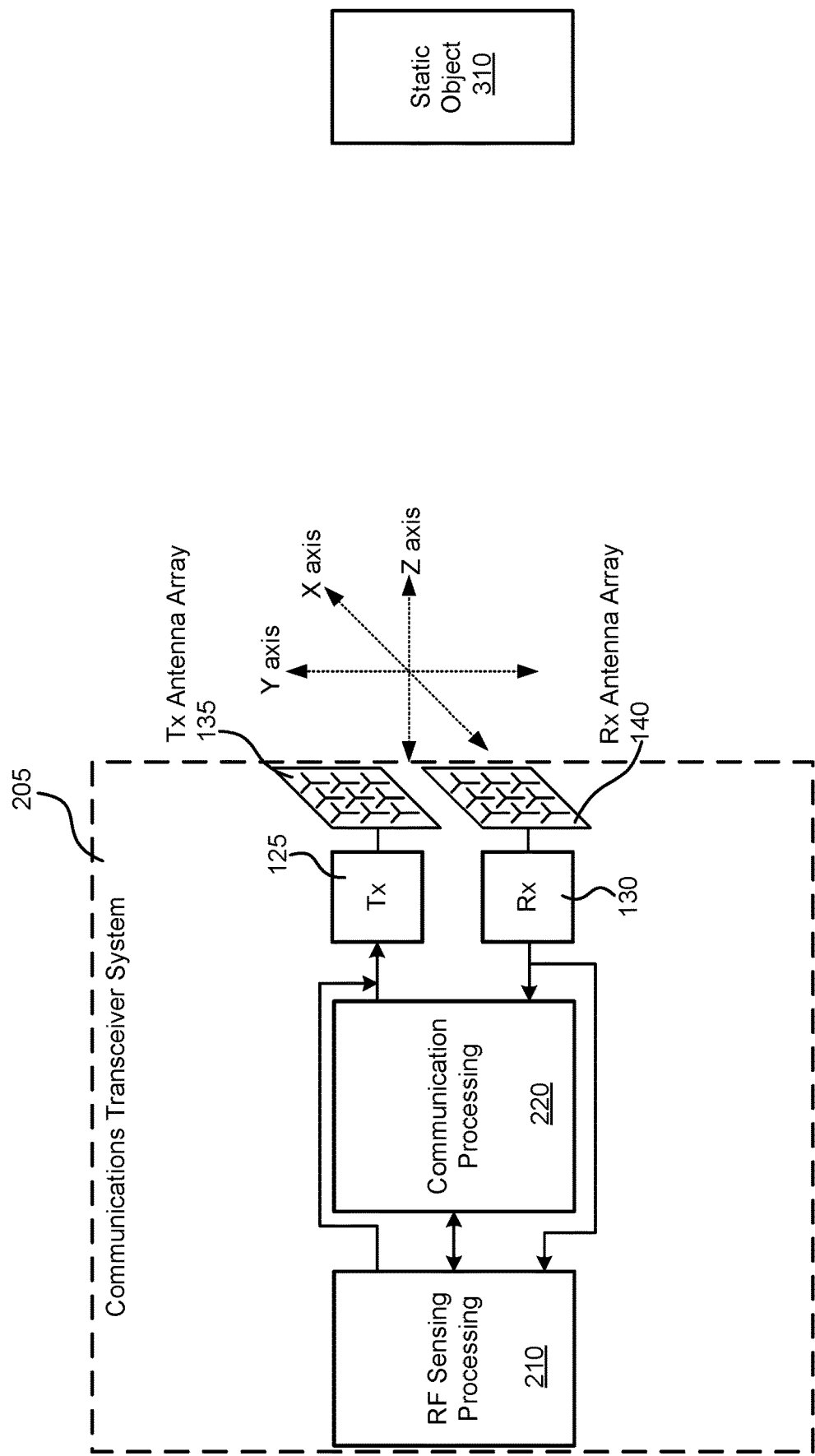
FIG. 3 is a block diagram of the communications transceiver system of FIG. 2, modified to help illustrate how the Tx antenna array and Rx antenna array can be moved, according to some embodiments, to detect a static object.

FIG. 3 is a block diagram of the communications transceiver system 205 of FIG. 2, modified to help illustrate how the Tx antenna array 135 and Rx antenna array 140 can be moved, according to some embodiments, to detect a static object 310. In this example, a set of mutually perpendicular axes are provided to show how Tx antenna array 135 and Rx antenna array 140 can be moved in three dimensions. The Z-axis is defined along the direction between the communications transceiver system 205 and the static object 310. The X and Y axes form a plane perpendicular to the Z-axis; the X-axis running laterally within the plane, and the Y-axis running vertically. Movement of the Tx antenna array 135 and Rx antenna array 140 can be generally described as parallel movement (along the z-axis, toward or away from the static object 310) and perpendicular movement (lateral or vertical movement within the XY-plane), where both antenna arrays 135, 140 undergo the same movement.

According to embodiments, either or both types of movement may be made to allow the communications transceiver system 205 to distinguish the static object 310 from self-interference. Parallel movement toward and/or away from the static object introduces a relative velocity to the static object 310, giving the static object 310 a Doppler signature that is distinguishable from self-interference. Perpendicular movement in the XY-plane can provide and angular diversity that can allow the static object 310 to be detected in cases where it otherwise may not be. Embodiments may include either or both types of movement to help distinguish the static object 310 from self-interference.

The type of movement can vary, depending on desired functionality. Movement may be continuous or discrete in time, for example, and may be periodic or aperiodic. Moreover, according to some embodiments, movement may be an on-demand feature. That is, although some embodiments may continuously move antenna arrays 135, 140 thereby enabling the detection of static objects at any time, other embodiments may only move antenna arrays 135, 140 the detection of the static object 310 is desired. For example, the communications transceiver system 205 may track an object moving across its field of view (within the RF sensing scanning volume of the communications transceiver). If the object stops without leaving the field of view, it may no longer be detected. If the communications transceiver system 205 determines the object has not left the field of view, it can move the antenna arrays 135, 140 as described herein to continue detecting the static object. Once the object begins to move, the communications transceiver system 205 may stop moving the antenna arrays 135, 140.

Alternative embodiments may employ different variations of movement, depending on desired functionality. During a given scan (e.g., while RF signals are being transmitted and/or received), for example, the communications transceiver system 205 may experience multiple types of movements, such as movements in directions. For example, movement may occur toward the static object 310 (e.g., along z-axis) during a portion of the scan, then away from the static object 310 during another portion of the scan. Additionally or alternatively, movement may take place along X and/or y-axes. Moreover, rotational movement may also occur.

According to some embodiments, the Tx antenna array 135 and Rx antenna array 140 may experience different movements during the scan. Some embodiments may, for example, be capable of moving the Tx antenna array 135 and Rx antenna array 140 independently (e.g., using different, independent movement mechanisms). Thus, movement during a scan may involve any combination of movement of the Tx antenna array 135 and/or Rx antenna array 140, including movement of both arrays (e.g., in the same or different manner) and moving one array while the other remains static.

It can be noted that both RF sensing and communication may be impacted due to the movement of the antenna arrays 135, 140. However, this can be compensated for. For example, because the movement is known, it can be canceled out in RF sensing. Doppler and/or angular changes introduced by the movement may be canceled out, so that the static object 310 is detected as having no movement. With regard to communications, a lower Modulation and Coding Scheme (MCS) may be chosen to help ensure communication channel quality is not negatively impacted. Additional or alternative compensation may be made for signal-to-noise ratio (SNR) loss in communications.

Figure 4A:
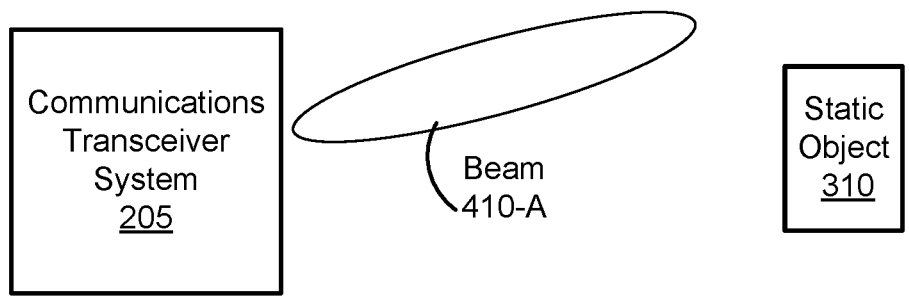
FIGS. 4A-C are a series of diagrams illustrating how, similar to moving antenna arrays, beam sweeping can be used to detect a static object.
Figure 4B:
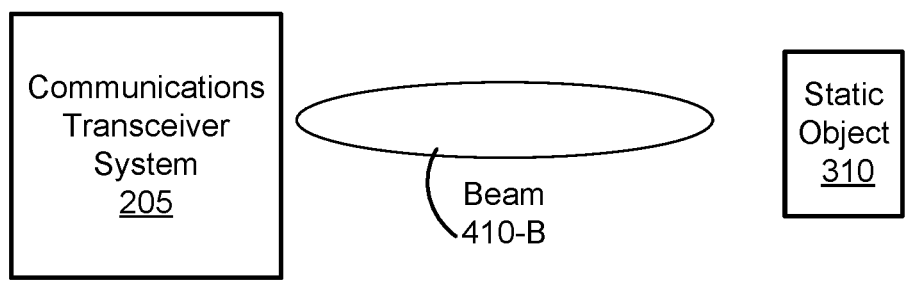
Figure 4C:
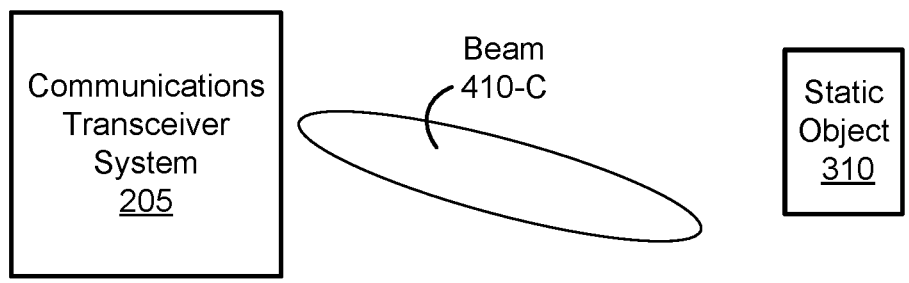

FIGS. 4A-C are a series of diagrams illustrating how, similar to moving antenna arrays, beam sweeping can be used to detect a static object 310. More specifically, the communications transceiver system 205 uses a series of beams (beam 410-A, beam 410-B, and beam 410-C, collectively and generically referred to herein as "beams 410") that provide sufficient angular diversity to detect the static object 310. Although some embodiments may use a series of discrete beams as described herein, alternative embodiments may use one or more beams that switch beam direction continuously over time. Additionally, similar to embodiments that employ movement, beam sweeping may be performed periodically or aperiodically.

Generally, put, the communications transceiver system 205 performs a beam sweep by sending and receiving RF signals using a first beam 410-A, followed by a second beam 410-B, followed by a third beam 410-C. In some embodiments the different beams 410 may overlap sufficiently to allow each beam 410 to detect the static object 310. This can provide angular diversity to the static object 310, allowing the static object to be detected at different angles, allowing it to be distinguished from self-interference. Of course, alternative embodiments may have more or fewer beams, and beam angle and breath may vary, depending on desired functionality. According to some embodiments, the communications transceiver system 205 may be capable of scanning different volumes using different combinations of beams.

It can be noted that the sweeping of the beam can vary, depending on desired functionality. As previously noted, the beam sweeping may involve the use of a plurality of discrete beams and/or may involve a continuous movement of one or more beams over time. Beam sweeping may take place in horizontal or vertical directions, or both. In some embodiments, beam sweeping may perform a scan of an area and may employ any of a variety of scan patterns (e.g., raster scan, spiral, interlace, etc.). The scan pattern may be based on an optimal performance of underlying scanning mechanisms (e.g., beamforming software and/or hardware, mechanical scanning mechanisms (e.g., servos, motors, etc.), and the like.

From a practical standpoint, using beam sweeping to detect static objects as described herein may be more easily implemented than moving Tx and Rx antenna arrays. Beams can be formed using antenna arrays, and such beamforming is often used in wireless communications, including 5G NR cellular communications. As such, techniques for beam sweeping herein, and/or techniques for using movement as previously described with regard to FIG. 3, may be used within a 5G NR network.

For example, embodiments using beam sweeping as described herein could be incorporated into a base station (e.g., gNB) of a 5G NR network. This could allow a base station to not only enable mobile devices to access the 5G NR network, but also give the base station RF sensing capabilities. With these additional RF sensing capabilities, a base station near a road, for example, could be able to gather information regarding traffic on the road, which could be provided to municipalities, traffic management systems, etc. Other devices (e.g., Wi-Fi access points, mobile phones, personal computers (PCs), notebooks, etc.) may also implement the techniques herein to detect static objects with RF sensing.

Beam sweeping in the manner described herein may be performed as part of the communication functionality for the communications transceiver system 205. For example, a base station in a 5G NR network already may perform such beam sweeping to determine where a mobile device is within an area of coverage, channel estimation, etc. In such instances, embodiments may leverage such beam sweeping to further perform RF sensing detection of static objects as described herein. However, in embodiments where such beam sweeping is not performed in the communication system, embodiments may introduce additional or alternative beams (in addition to beams used in communication) to perform this functionality.

It can be further noted that other techniques for object detection in RF sensing can be used in conjunction with the techniques described herein. In some embodiments, for example, if an object is detected, beam tracking can be used to track the object, and beam sweeping can be limited to a range near the object, which can increase the resolution of the RF sensing and/or decrease the amount of sweeping needed.

Figure 5:
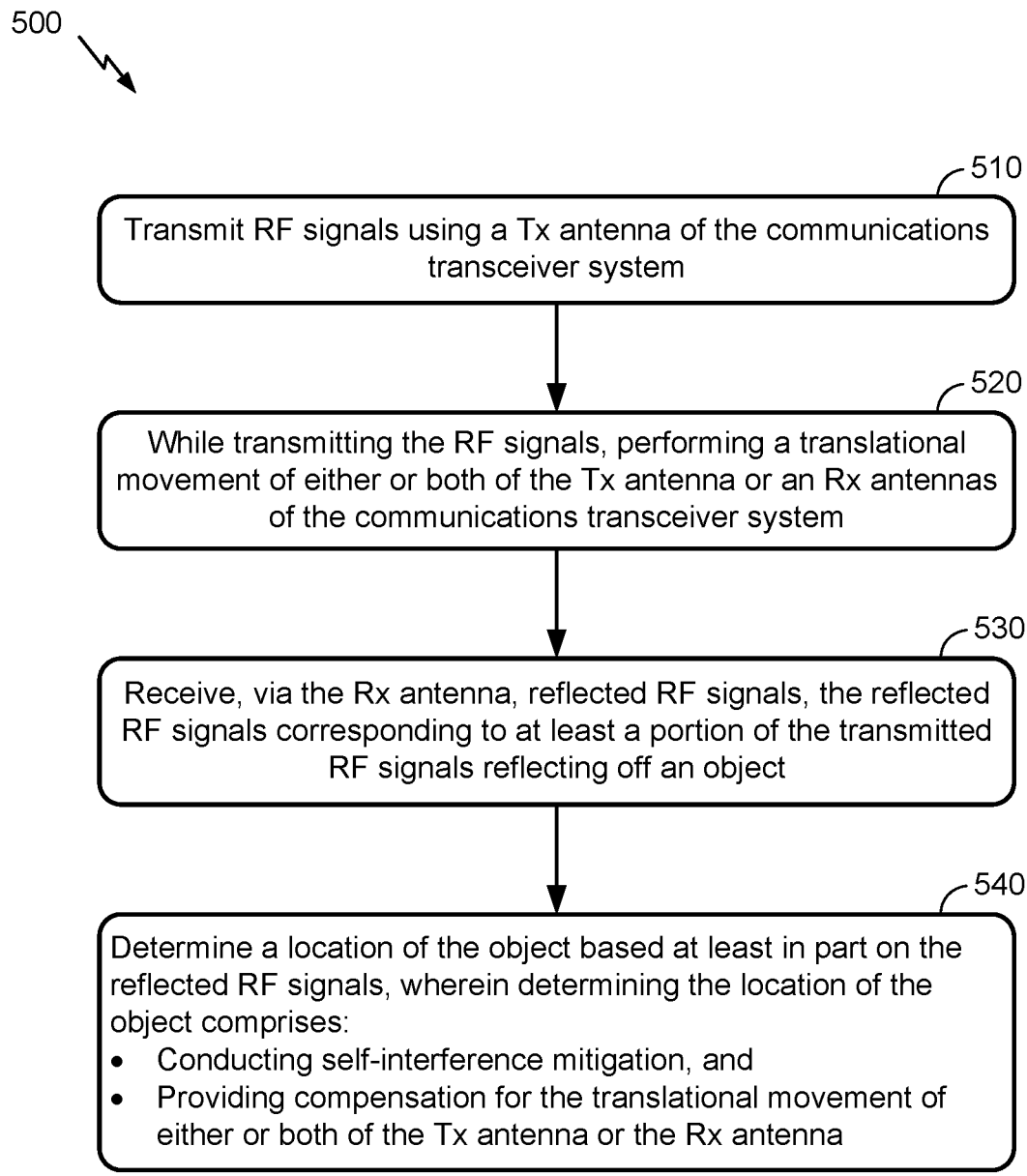
FIG. 5 is a flow diagram of a method of operating a communications transceiver system to detect static objects, according to an embodiment.

FIG. 5 is a flow diagram of a method 500 of operating a communications transceiver system to detect static objects, according to an embodiment. The method 500 illustrates aspects of the functionality in the above-described embodiments. One or more of the functions described in the blocks illustrated in FIG. 5 may be performed by software and/or hardware components of a communications transceiver system, such as the RF sensing system 105 illustrated in FIG. 1, or communications transceiver system 205 of FIG. 2, either of which may be incorporated into an electronic device, such as the electronic device 700 illustrated in FIG. 7. Moreover, a person of ordinary skill in the art will appreciate that alternative embodiments may vary in the way they implement the functions illustrated in FIG. 5 by adding, omitting, combining, separating, and otherwise varying the functions illustrated in the blocks of FIG. 5.

At block 510, the functionality includes transmitting RF signals using a Tx antenna of the communications transceiver system. As noted, these RF signals may comprise pulses or waveforms that may allow a communications transceiver system to obtain a CIR from the RF signals. As such, RF signals may comprise OFDM signals and/or may comprise packets that may be encoded and decoded in a manner reflecting communication applications (rather that of traditional RF sensing applications). Among other things, this can help ensure efficient use of related hardware and/or software. These packets may include linear Frequency Modulated Continuous Wave (FMCW), m-sequence, Ipatov, and/or other CIR estimation techniques. However, the use of Golay sequences can be superior in both accuracy and power consumption, in many instances. For example, the use of Golay sequences in a Channel Estimation Field (CEF) in the packets carried by the RF signals may be used. Such packets can include 5G NR signals, or signals defined by the 5G NR standard, which may be used for channel estimation or communication. It can be further noted that, in instances where RF signals are not transmitted for communication (e.g., in directions in which communication isn't needed) RF signals may comprise a dedicated RF sensing signal, which can be any waveform optimized for RF sensing or OFDM waveform.

As noted, to help mitigate impacts on communication functions of the communications transceiver system, an MCS may be selected to accommodate the communications transceiver functionality. Thus, in some embodiments, the method 500 may further comprise, prior to transmitting the RF signals, determining use the RF signals for static object detection, and determining an MCS for the RF signals based at least in part on the determination to use the RF signals for static object detection.

According to some embodiments, the communications transceiver system may operate in different modes. This may include, for example, a communications mode and an RF-sensing mode. Depending on desired functionality, the communications transceiver system may be capable of operating exclusively in one mode or the other, or may be capable of operating in both modes simultaneously (e.g., performing one or more of the operations illustrated in FIG. 5 while also operating in the communications mode).

Further, as previously noted, functions of the method 500 may be performed by an entity (network node or user equipment (UE)) within a cellular network, such as a 5G NR network. Thus, according to some embodiments, the communications transceiver system comprises a cellular base station. In some embodiments, the communications transceiver system is located on a vehicle. In such embodiments, the method 500 may further comprise tracking and maintaining a communication connection with at least one UE. This can help mitigate any impact on communications with the at least one UE that performing the method 500 may have. Additional or alternative embodiments may be integrated into and/or executed by other cellular network-connected devices.

Means for performing the functionality at block 510 may include, for example, a Tx antenna array 125, RF sensing processing 210 (which, as noted may include a processor 115 and memory 117), communication processing 220 (which may also include a processor 115 and memory 117) and/or other components of a communications transceiver system 205.

At block 520, the functionality comprises, while transmitting the RF signals, performing a translational movement of either or both of the Tx antenna or an Rx antenna of the communications transceiver system. Moving both antennas together can have twice the effect on Doppler than moving only one antenna, but some embodiments may move only one antenna (based on manufacturing and/or other concerns, for example). This may include, for example, activating one or more servos or motors capable of providing the desired movement to allow for the detection of a static object in the manner discussed in the previously described embodiments. As noted, movement can be coordinated with the transmission of RF signals to allow for proper cancellation of the effects of the movement (e.g., at a Doppler and/or angular changes to the detected static object). Again, depending on desired functionality, movement may be periodic or aperiodic, continuous or discrete, and/or dynamic (e.g., as needed) or static (e.g., "always on").

As previously described with regard to FIG. 3, translational movement may be parallel or perpendicular to the static object, or combination of both. That is, for a first dimension defined by a line extending from the communications transceiver system to the object, performing the translational movement of either or both of the Tx antenna or the Rx antenna of the communications transceiver system may comprise moving either or both of the Tx antenna or the Rx antenna along the first dimension toward the object, away from the object, or both; or moving either or both of the Tx antenna or the Rx antenna in a plane perpendicular to the first dimension; or any combination thereof. During subsequent processing of reflected signals (e.g., at block 540) antenna orientation can be determined with an Angle-of-Arrival (AoA) measurement at the Rx antennas. In view of the various types of movement embodiments may employ as previously described, the functionality at block 520 of moving either or both of the Tx antenna or the Rx antenna may comprise moving the Tx antenna in a manner different than the Rx antenna. Moreover, according to some embodiments, moving the Tx antenna in a manner different than the Rx antenna may comprise moving the Tx antenna in a first direction, and moving the Rx antenna in a second direction different than the first direction. Additionally or alternatively, moving either or both of the Tx antenna or the Rx antenna may comprise changing a direction of movement of either or both of the Tx antenna or the Rx antenna while transmitting the RF signals, receiving reflected RF signals, or both.

Means for performing the functionality at block 520 may include, for example, a Tx antenna array 125, RF sensing processing 210 (which as noted may include a processor 115 and memory 117), communication processing 220 (which may also include a processor 115 and memory 117) and/or other components of a communications transceiver system 205. Means may also comprise any servos, actuators, motors, etc. used to carry out the motion, as well as controllers to control such means. In some embodiments, these controllers may be in communication with one or more processors of the RF sensing processing 210, communication processing 220, or both, to coordinate the movement with the transmission of the RF signals.

At block 530, the functionality comprises receiving, via the Rx antenna, reflected RF signals, where the reflected RF signals corresponds to at least a portion of the transmitted RF signals reflecting off an object. Depending on the desired range granularity for the RF sensing, the sample rate of the received signals may vary, as well as the period of time in which samples are made. As will be appreciated, a relatively high sample rate can result in a relatively high granularity of range samples, any relatively long period of time in which samples are collected may result in a deeper volume of space scanned by the RF sensing system. Means for performing the functionality at block 530 may include, for example, an Rx antenna array 130, RF sensing processing 210, communication processing 220 and/or other components of a communications transceiver system 205.

At block 540, the functionality of the method 500 comprises determining a location of the object based at least in part on the reflected RF signals, wherein determining the location of the object comprises conducting self-interference mitigation and providing compensation for the movement of either or both of the Tx antenna or the Rx antenna. Because of the movement provided at block 520, the RF signals reflected off the object (received at block 530) will introduce Doppler and/or angular diversity if the object is static. This can help distinguish those signals from self-interference, thereby allowing self-interference mitigation techniques (e.g., static signal filtration) to be performed to remove static signals while preserving data from the reflected RF signals. The compensation for the movement of the Tx and Rx antennas can be made to the RF sensing data of the received RF signals to help remove errors introduced by the movement. According to some embodiments, determining the location of the object may comprise determining a difference between (i) a first RF signal transmitted when either or both of the Tx antenna or an Rx antenna was at a first location, and (ii) a second RF signal transmitted when either or both of the Tx antenna or an Rx antenna was at a second. For example, after compensating for translational movement of either or both of the Tx antenna or the Rx antenna, the object may be detected from a difference between the first RF signal and the second RF signal. Means for performing the functionality at block 540 may include, for example, RF sensing processing 210, and/or other components of a communications transceiver system 205.

Figure 6:
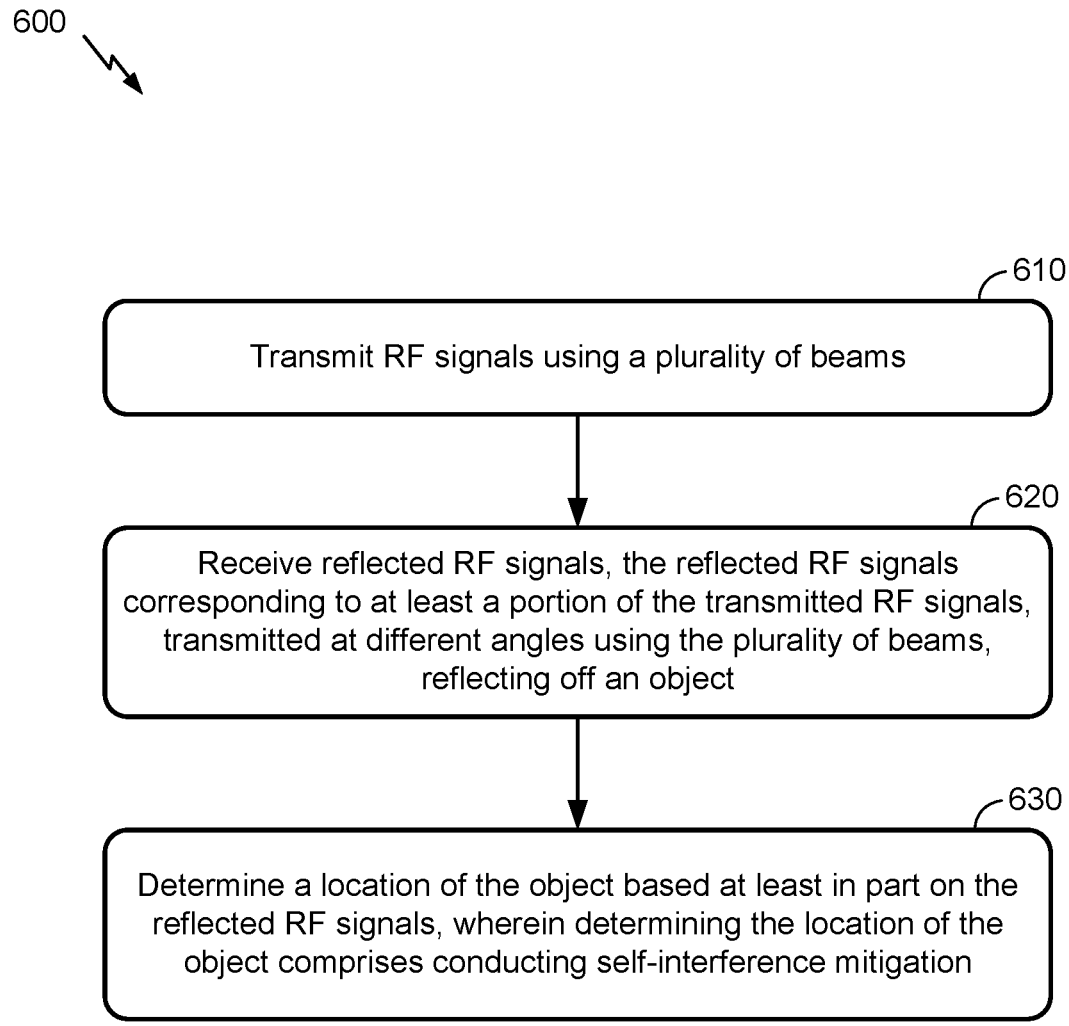
FIG. 6 is a flow diagram of another method of operating a communications transceiver system to detect static objects in a communications transceiver system, according to an embodiment.

FIG. 6 is a flow diagram of another method 600 of operating a communications transceiver system to detect static objects, according to an embodiment. Similar to the method 500 of FIG. 5, the method 600 illustrates aspects of the functionality in the above-described embodiments. Moreover, one or more of the functions described in the blocks illustrated in FIG. 6 may be performed by software and/or hardware components of a RF sensing system, such as the RF sensing system 105 illustrated in FIG. 1, or communications transceiver system 205 of FIG. 2, either of which may be incorporated into an electronic device, such as the electronic device 700 illustrated in FIG. 7. Additionally, a person of ordinary skill in the art will appreciate that alternative embodiments may vary in the way they implement the functions illustrated in FIG. 6 by adding, omitting, combining, separating, and otherwise varying the functions illustrated in the blocks of FIG. 6.

At block 610, the functionality includes transmitting RF signals using a plurality of beams. In alternative embodiments, the functionality may include transmitting RF signals using one or more beams. As previously indicated, some embodiments may transmit RF signals using plurality of discrete beams, where coverage may overlap (e.g., a beam may cover at least a portion of an area covered by at least one other beam). That said, other embodiments may use one or more beams that move (e.g., rotate) over time to transmit RF signals at different angles (e.g., where beam sweeping is conducted via a physical mechanism). In either case, RF signals transmitted at different angles can reflect off an object at different angles, which can introduce angular diversity to RF signals of a static object. This enables reflections (reflected RF signals) from the static object to be distinguished over self-interference. As with the RF signals described in relation to FIG. 5, these RF signals may comprise pulses or waveforms that may allow a communications transceiver system to obtain a CIR from the RF signals. As such, RF signals may comprise packets that include FMCW, m-sequence, Ipatov, Golay sequences, and/or other CIR estimation techniques. Such packets can include 5G NR signals, or signals defined by the 5G NR standard, which may be used for channel estimation or communication. Depending on desired functionality, some embodiments may vary beam width depending on desired distance and/or resolution.

Again, to help mitigate impacts on communication functions of the communications transceiver system, and MCS may be selected to accommodate the communications transceiver functionality. Thus, in some embodiments, the method 600 may further comprise, prior to transmitting the RF signals, determining to use the RF signals for static object detection, and determining an MCS for the RF signals based at least in part on the determination to use the RF signals for static object detection.

According to some embodiments, the communications transceiver system may operate in different modes. This may include, for example, a communications mode and an RF-sensing mode. Depending on desired functionality, the communications transceiver system may be capable of operating exclusively in one mode or the other, or may be capable of operating in both modes simultaneously (e.g., performing one or more of the operations illustrated in FIG. 6 while also operating in the communications mode).

Further, as previously noted, functions of the method 600 may be performed by an entity (network node or UE) within a cellular (e.g., 5G NR) network. Thus, according to some embodiments, the communications transceiver system comprises a cellular base station. In such embodiments, the method 600 may further comprise tracking and maintaining a communication connection with at least one UE. This can help mitigate any impact on communications with the at least one UE that performing the method 600 may have. In other embodiments, the communications transceiver system is located on a vehicle. Additional or alternative embodiments may be integrated into and/or executed by other cellular network-connected devices.

Means for performing the functionality at block 610 may include, for example, a Tx antenna array 125, RF sensing processing 210 (which, as noted may include a processor 115 and memory 117), communication processing 220 (which may also include a processor 115 and memory 117) and/or other components of a communications transceiver system 205.

At block 620, the functionality comprises receiving reflected RF signals, where the reflected RF signals correspond to at least a portion of the transmitted RF signals, transmitted at different angles using the plurality of beams, reflecting off an object. Again, depending on the desired range granularity for the RF sensing, the sample rate of the received signals may vary, as well as the period of time in which samples are made. As will be appreciated, a relatively high sample rate can result in a relatively high granularity of range samples, any relatively long period of time in which samples are collected may result in a deeper volume of space scanned by the RF sensing system. Means for performing the functionality at block 620 may include, for example, an Rx antenna array 130, RF sensing processing 210, communication processing 220 and/or other components of a communications transceiver system 205.

At block 630, the functionality of the method 600 comprises determining a location of the object based at least in part on the reflected RF signals, wherein determining the location of the object comprises conducting self-interference mitigation. Again, because of the angular diversity introduced by the object reflecting RF signals transmitted at different angles (e.g., by different discrete beams or with one or more beams that move, enabling transmission at different angles), these signals can be distinguished from self-interference, thereby allowing self-interference mitigation techniques (e.g., static signal filtration) to be performed to remove static signals while preserving data from the reflected RF signals. The object can then be detected from reflected the RF signals of one or more beams of the plurality beams. According to some embodiments, determining the location of the object may comprise determining a difference between (i) a first RF signal transmitted at a first angle, and (ii) a second RF signal transmitted at a second angle. For example, after optionally compensating for the difference in first and second angles, the object may be detected from a difference between the first RF signal and the second RF signal. Means for performing the functionality at block 630 may include, for example, RF sensing processing 210, and/or other components of a communications transceiver system 205.

FIG. 7 is a block diagram of an embodiment of an electronic device 700, which may incorporate a RF sensing system 105 or communications transceiver system 205 that can be operated in the manner discussed in the previously described embodiments. As noted, such electronic devices can include a vehicle, cellular base station, mobile phone, etc. It should be noted that FIG. 7 is meant only to provide a generalized illustration of various components, any or all of which may be utilized as appropriate. FIG. 7, therefore, broadly illustrates how individual system elements may be implemented in a relatively separated or relatively more integrated manner. In addition, it can be noted that components illustrated by FIG. 7 can be localized to a single device and/or distributed among various networked devices, which may be disposed at different physical or geographical locations. The electronic device 700 may comprise and/or be integrated into any of a variety of devices, including a mobile phone, personal computer, vehicle, and/or the like.

The electronic device 700 is shown comprising hardware elements that can be electrically coupled via a bus 705 (or may otherwise be in communication, as appropriate). The hardware elements may include processor(s) 710, which can include without limitation one or more general-purpose processors, one or more special-purpose processors (such as a DSP, graphics processing unit (GPU), application-specific integrated circuit (ASIC), field-programmable gate array (FPGA), and/or the like), and/or other processing structure, which can be configured to perform one or more of the methods described herein, including the methods described in relation to FIGS. 5-6. The electronic device 700 also can include one or more input devices 715, which can include without limitation a mouse, a keyboard, a camera, a microphone, a touchscreen, and/or the like; and one or more output devices 720, which can include without limitation a display device, a speaker, and/or the like.

The electronic device 700 may further include (and/or be in communication with) one or more non-transitory storage devices 725, which can comprise, without limitation, local and/or network accessible storage, and/or can include, without limitation, a disk drive, a drive array, an optical storage device, a solid-state storage device (such as a random access memory (RAM) and/or a read-only memory (ROM)), which can be programmable, flash-updateable, and/or the like. Such storage devices may be configured to implement any appropriate data stores, including without limitation, various file systems, database structures, and/or the like.

The electronic device 700 may also include a communications subsystem 730, which can include support of wireline communication technologies and/or wireless communication technologies (in some embodiments) managed and controlled by a wireless communication interface 733. The communications subsystem 730 may include a modem, a network card (wireless or wired), an infrared communication device, a wireless communication device, and/or a chipset, and/or the like. The communications subsystem 730 may include one or more input and/or output communication interfaces, such as the wireless communication interface 733, to permit data and signaling to be exchanged with a network, mobile devices, other computer systems, and/or any other electronic devices described herein. As previously noted, a RF sensing system 105 (as illustrated in FIG. 1) may be incorporated into a wireless communications interface 733 such that antenna elements in a Tx antenna array 135 and Rx antenna array 140, and the circuitry connected with the antenna elements (e.g., the other components of the RF sensing system 105), may be used for both RF imaging and data communication. In such embodiments, the wireless communications interface 733 including the RF sensing system 105 may correspond to a communications transceiver system 205 of FIG. 2, an may have components similar to those illustrated in FIG. 2. For example, in some embodiments, the wireless communication interface 733 may comprise an 802.11ad- and/or 802.11ay-compatible modem capable of both RF sensing-based object detection and data communication. In some embodiments, the wireless communication interface 733 may comprise a modem capable of 5G NR communications and RF sensing-based object detection.

In some embodiments, the electronic device 700 will further comprise a working memory 735, which can include a RAM and/or or ROM device. Software elements, shown as being located within the working memory 735, can include an operating system 740, device drivers, executable libraries, and/or other code, such as application(s) 745, which may comprise computer programs provided by various embodiments, and/or may be designed to implement methods, and/or configure systems, provided by other embodiments, as described herein. Merely by way of example, one or more procedures described with respect to the method(s) discussed above, such as the methods described in relation to FIGS. 5-6, may be implemented as code and/or instructions that are stored (e.g. temporarily) in working memory 735 and are executable by a computer (and/or a processor within a computer such as processor(s) 710); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 725 described above. In some cases, the storage medium might be incorporated within a computer system, such as electronic device 700. In other embodiments, the storage medium might be separate from a computer system (e.g., a removable medium, such as an optical disc), and/or provided in an installation package, such that the storage medium can be used to program, configure, and/or adapt a general purpose computer with the instructions/code stored thereon. These instructions might take the form of executable code, which is executable by the electronic device 700 and/or might take the form of source and/or installable code, which, upon compilation and/or installation on the electronic device 700 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processors and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, any other physical medium with patterns of holes, a RAM, a programmable ROM (PROM), erasable programmable ROM (EPROM), a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the spirit of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description, embodiments may include different combinations of features. Implementation examples are described in the following numbered clauses:

Clause 1. A method of operating a communications transceiver system to detect static objects, the method comprising: transmitting radio frequency (RF) signals using a Tx antenna of the communications transceiver system; while transmitting the RF signals, performing a translational movement of either or both of the Tx antenna or an Rx antenna of the communications transceiver system; receiving, via the Rx antenna, reflected RF signals, the reflected RF signals corresponding to at least a portion of the transmitted RF signals reflecting off an object; and determining a location of the object based at least in part on the reflected RF signals, wherein determining the location of the object comprises: conducting self-interference mitigation; and providing compensation for the translational movement of either or both of the Tx antenna or the Rx antenna.

Clause 2. The method of clause 1, wherein the RF signals comprise 5G NR signals.

Clause 3. The method of any of clauses 1-2 further comprising prior to transmitting the RF signals, determining to use the RF signals for static object detection; and determining a Modulation and Coding Scheme (MCS) for the RF signals based at least in part on the determination to use the RF signals for static object detection.

Clause 4. The method of any of clauses 1-3 wherein the communications transceiver system comprises a cellular base station.

Clause 5. The method of clause 4 wherein the method comprises tracking and maintaining a communication connection with at least one User Equipment (UE).

Clause 6. The method of any of clauses 1-3 wherein the communications transceiver system is located on a vehicle.

Clause 7. The method of any of clauses 1-6 wherein, for a first dimension defined by a line extending from the communications transceiver system to the object, performing a translational movement of either or both of the Tx antenna or the Rx antenna of the communications transceiver system further comprises moving either or both of the Tx antenna or the Rx antenna along the first dimension toward the object, away from the object, or both; or moving either or both of the Tx antenna or the Rx antenna in a plane perpendicular to the first dimension; or any combination thereof.

Clause 8. The method of any of clauses 1-7 wherein performing a translational movement of either or both of the Tx antenna or the Rx antenna comprises moving the Tx antenna in a manner different than the Rx antenna.

Clause 9. The method of clause 8 wherein moving the Tx antenna in a manner different than the Rx antenna comprises: moving the Tx antenna in a first direction, and moving the Rx antenna in a second direction different than the first direction.

Clause 10. The method of any of clauses 1-9 wherein moving either or both of the Tx antenna or the Rx antenna comprises changing a direction of movement of either or both of the Tx antenna or the Rx antenna while transmitting the RF signals, receiving reflected RF signals, or both.

Clause 11. The method of any of clauses 1-10 further comprising using either or both of the Tx antenna or the Rx antenna for wireless communications.

Clause 12. The method of any of clauses 1-11 wherein determining the location of the object comprises determining a difference between (i) a first RF signal transmitted when either or both of the Tx antenna or an Rx antenna was at a first location, and (ii) a second RF signal transmitted when either or both of the Tx antenna or an Rx antenna was at a second.

Clause 13. A method of operating a communications transceiver system to detect static objects, the method comprising: transmitting radio frequency (RF) signals using a plurality of beams; receiving reflected RF signals, the reflected RF signals corresponding to at least a portion of the transmitted RF signals, transmitted at different angles using the plurality of beams, reflecting off an object; and determining a location of the object based at least in part on the reflected RF signals, wherein determining the location of the object comprises conducting self-interference mitigation.

Clause 14. The method of clause 13, wherein the RF signals comprise 5G NR signals.

Clause 15. The method of any of clauses 13-14 further comprising prior to transmitting the RF signals, determining to use the RF signals for static object detection; and determining a Modulation and Coding Scheme (MCS) for the RF signals based at least in part on the determination to use the RF signals for static object detection.

Clause 16. The method of any of clauses 13-15 wherein the communications transceiver system comprises a cellular base station.

Clause 17. The method of clause 16 wherein the method comprises tracking and maintaining a communication connection with at least one User Equipment (UE).

Clause 18. The method of any of clauses 13-15 wherein the communications transceiver system is located on a vehicle.

Clause 19. The method of any of clauses 13-18 wherein we transmitted RF signals are transmitted at different angles using a plurality of discrete beams of the plurality of beams.

Clause 20. The method of any of clauses 13-19 wherein the RF signals are transmitted using a one or more moving beams.

Clause 21. The method of any of clauses 13-20 wherein a Tx antenna is used to transmit the RF signals and an Rx antenna is used to receive the RF signals, and wherein either or both of the Tx antenna or the Rx antenna is used for wireless communications.

Clause 22. The method of any of clauses 13-21 wherein determining the location of the object comprises determining a difference between (i) a first RF signal transmitted at a first angle, and (ii) a second RF signal transmitted at a second angle.

Clause 23. A communications transceiver system for detecting static objects, the communications transceiver system comprising: a transceiver; a memory; and one or more processors communicatively coupled with the transceiver and the memory, wherein the one or more processors are configured to: transmit radio frequency (RF) signals using a Tx antenna of the communications transceiver system; while transmitting the RF signals, performing a translational movement of either or both of the Tx antenna or an Rx antenna of the communications transceiver system; receive, via the Rx antenna, reflected RF signals, the reflected RF signals corresponding to at least a portion of the transmitted RF signals reflecting off an object; and determine a location of the object based at least in part on the reflected RF signals, wherein determining the location of the object comprises: conduct self-interference mitigation; and provide compensation for the translational movement of either or both of the Tx antenna or the Rx antenna.

Clause 24. The communications transceiver system of clause 23, wherein the RF signals comprise 5G NR signals.

Clause 25. The communications transceiver system of any of clauses 23-24 wherein the one or more processors are further configured to: prior to transmitting the RF signals, determining to use the RF signals for static object detection; and determining a Modulation and Coding Scheme (MCS) for the RF signals based at least in part on the determination to use the RF signals for static object detection.

Clause 26. The communications transceiver system of any of clauses 23-25 wherein the communications transceiver system comprises a cellular base station.

Clause 27. The communications transceiver system of clause 26 wherein the method comprises tracking and maintaining a communication connection with at least one User Equipment (UE).

Clause 28. The communications transceiver system of any of clauses 23-25 wherein the communications transceiver system is located on a vehicle.

Clause 29. The communications transceiver system of any of clauses 23-28 wherein, for a first dimension defined by a line extending from the communications transceiver system to the object, performing a translational movement of either or both of the Tx antenna or the Rx antenna of the communications transceiver system wherein the one or more processors are further configured to move either or both of the Tx antenna or the Rx antenna along the first dimension toward the object, away from the object, or both; or move either or both of the Tx antenna or the Rx antenna in a plane perpendicular to the first dimension; or any combination thereof.

Clause 30. The communications transceiver system of any of clauses 23-29 wherein, to perform a translational movement of either or both of the Tx antenna or the Rx antenna, the one or more processors are configured to move the Tx antenna in a manner different than the Rx antenna.

Clause 31. The communications transceiver system of clause 30 wherein, to move the Tx antenna in a manner different than the Rx antenna, the one or more processors are configured to move the Tx antenna in a first direction, and move the Rx antenna in a second direction different than the first direction.

Clause 32. The communications transceiver system of any of clauses 23-31 wherein, to move either or both of the Tx antenna or the Rx antenna, the one or more processors are configured to change a direction of movement of either or both of the Tx antenna or the Rx antenna while transmitting the RF signals, receiving reflected RF signals, or both.

Clause 33. The communications transceiver system of any of clauses 23-32 wherein the one or more processors are further configured to use either or both of the Tx antenna or the Rx antenna for wireless communications.

Clause 34. The communications transceiver system of any of clauses 23-33 wherein, to determine the location of the object, the one or more processors are configured to determine a difference between (i) a first RF signal transmitted when either or both of the Tx antenna or an Rx antenna was at a first location, and (ii) a second RF signal transmitted when either or both of the Tx antenna or an Rx antenna was at a second.

Clause 35. A communications transceiver system for operating a communications transceiver system to detect static objects, the communications transceiver system comprising: a transceiver; a memory; and one or more processors communicatively coupled with the transceiver and the memory, wherein the one or more processors are configured to: transmit radio frequency (RF) signals using a plurality of beams; receive reflected RF signals, the reflected RF signals corresponding to at least a portion of the transmitted RF signals, transmitted at different angles using the plurality of beams, reflecting off an object; and determine a location of the object based at least in part on the reflected RF signals, wherein determining the location of the object comprises conducting self-interference mitigation.

Clause 36. The communications transceiver system of clause 35, wherein the RF signals comprise 5G NR signals.

Clause 37. The communications transceiver system of any of clauses 35-36 wherein the one or more processors are further configured to: prior to transmitting the RF signals, determining to use the RF signals for static object detection; and determining a Modulation and Coding Scheme (MCS) for the RF signals based at least in part on the determination to use the RF signals for static object detection.

Clause 38. The communications transceiver system of any of clauses 35-37 wherein the communications transceiver system comprises a cellular base station.

Clause 39. The communications transceiver system of clause 38 wherein the method comprises tracking and maintaining a communication connection with at least one User Equipment (UE).

Clause 40. The communications transceiver system of any of clauses 35-37 wherein the communications transceiver system is located on a vehicle.

Clause 41. The communications transceiver system of any of clauses 35-40 wherein we transmitted RF signals are transmitted at different angles using a plurality of discrete beams of the plurality of beams.

Clause 42. The communications transceiver system of any of clauses 35-41 wherein the RF signals are transmitted using a one or more moving beams.

Clause 43. The communications transceiver system of any of clauses 35-42 wherein a Tx antenna is used to transmit the RF signals and an Rx antenna is used to receive the RF signals, and wherein either or both of the Tx antenna or the Rx antenna is used for wireless communications.

Clause 44. The communications transceiver system of any of clauses 35-43 wherein, to determine the location of the object, the one or more processors are configured to determine a difference between (i) a first RF signal transmitted at a first angle, and (ii) a second RF signal transmitted at a second angle.

Clause 45. A device or apparatus having means for performing the method of any one of clauses 1-22.

Clause 46. A non-transitory computer-readable medium storing instructions comprising code for performing the methods of any one of clauses 1-22.

What is claimed is:

1. A method of operating a communications transceiver system to detect static objects, the method comprising:
    transmitting radio frequency (RF) signals using a transmit (Tx) antenna of the communications transceiver system;
    while transmitting the RF signals, performing a translational movement of either or both of the Tx antenna or a receive (Rx) antenna of the communications transceiver system, the translational movement comprising either or both of:
        a first movement along an axis defined by a line extending from the communications transceiver system to the static object, or
        a second movement in a plane perpendicular to the axis;
    receiving, via the Rx antenna, reflected RF signals, the reflected RF signals corresponding to at least a portion of the transmitted RF signals reflecting off the static object; and
    determining a location of the static object based at least in part on the reflected RF signals, wherein determining the location of the static object comprises:
        conducting self-interference mitigation, the self-interference mitigation comprising:
            distinguishing the static object from self-interference based at least in part on either or both of:
                an angular diversity of the reflected RF signals being introduced at least in part by the second movement, or
                a Doppler signature of the reflected RF signals being introduced at least in part by the first movement; and
            providing compensation for the translational movement of either or both of the Tx antenna or the Rx antenna.

2. The method of claim 1, wherein the RF signals comprise 5G New Radio (NR) signals.

3. The method of claim 2, further comprising:
    prior to transmitting the RF signals, determining to use the RF signals for static object detection; and
    determining a Modulation and Coding Scheme (MCS) for the RF signals based at least in part on the determination to use the RF signals for static object detection.

4. The method of claim 1, wherein the communications transceiver system comprises a cellular base station.

5. The method of claim 4, wherein the method comprises tracking and maintaining a communication connection with at least one User Equipment (UE).

6. The method of claim 1, wherein the communications transceiver system is located on a vehicle.

7. The method of claim 1, wherein performing a translational movement of either or both of the Tx antenna or the Rx antenna comprises moving the Tx antenna in a manner different than the Rx antenna.

8. The method of claim 7, wherein moving the Tx antenna in the manner different than the Rx antenna comprises:
    moving the Tx antenna in a first direction, and
    moving the Rx antenna in a second direction different than the first direction.

9. The method of claim 1, wherein performing the translational movement of either or both of the Tx antenna or the Rx antenna comprises changing a direction of movement of either or both of the Tx antenna or the Rx antenna while transmitting the RF signals, receiving reflected RF signals, or both.

10. The method of claim 1, further comprising using either or both of the Tx antenna or the Rx antenna for wireless communications.

11. The method of claim 1, wherein determining the location of the static object comprises determining a difference between (i) a first RF signal transmitted when either or both of the Tx antenna or the Rx antenna was at a first location, and (ii) a second RF signal transmitted when either or both of the Tx antenna or the Rx antenna was at a second.

12. A communications transceiver system for detecting static objects, the communications transceiver system comprising:
    a transceiver comprising a transmit (Tx) antenna and a receive (Rx) antenna;
    a memory; and
    one or more processors communicatively coupled with the transceiver and the memory, wherein the one or more processors are configured to:
        transmit radio frequency (RF) signals using the Tx antenna;
        while transmitting the RF signals, perform a translational movement of either or both of the Tx antenna or the Rx antenna, the translational movement comprising either or both of:
            a first movement along an axis defined by a line extending from the communications transceiver system to the static object, or
            a second movement in a plane perpendicular to the axis;
        receive, via the Rx antenna, reflected RF signals, the reflected RF signals corresponding to at least a portion of the transmitted RF signals reflecting off the static object; and
        determine a location of the static object based at least in part on the reflected RF signals, wherein determining the location of the static object comprises:
            conducting self-interference mitigation, the self-interference mitigation comprising:
                distinguishing the static object from self-interference based at least in part on either or both of:

an angular diversity of the reflected RF signals being introduced at least in part by the second movement, or a Doppler signature of the reflected RF signals being introduced at least in part by the first movement; and providing compensation for the translational movement of either or both of the Tx antenna or the Rx antenna.

13. The communications transceiver system of claim 12, wherein, to transmit the RF signals, the transceiver is configured to transmit 5G New Radio (NR) signals.

14. The communications transceiver system of claim 12, wherein the one or more processors are further configured to:

prior to transmitting the RF signals, determine to use the RF signals for static object detection; and determine a Modulation and Coding Scheme (MCS) for the RF signals based at least in part on the determination to use the RF signals for static object detection.

15. The communications transceiver system of claim 12, wherein the communications transceiver system comprises a cellular base station.

16. The communications transceiver system of claim 12, wherein, to perform the translational movement of either or both of the Tx antenna or the Rx antenna, the one or more processors are configured to move the Tx antenna in a manner different than the Rx antenna.

* * * * *